United States Patent
Currier et al.

(10) Patent No.: US 7,378,019 B1
(45) Date of Patent: May 27, 2008

(54) FILTER ASSEMBLY WITH VORTEX FLUID DISTRIBUTOR

(75) Inventors: Jon D. Currier, Edmond, OK (US); Scott Stayton, Edmond, OK (US)

(73) Assignee: Little Giant Pump Company, Oklahoma City, OK (US)

(*) Notice: Subject to any disclaimer, the term of this patent is extended or adjusted under 35 U.S.C. 154(b) by 510 days.

(21) Appl. No.: 10/994,748

(22) Filed: Nov. 19, 2004

Related U.S. Application Data

(60) Provisional application No. 60/523,835, filed on Nov. 19, 2003.

(51) Int. Cl.
*B01D 24/40* (2006.01)
(52) U.S. Cl. .................. 210/289; 210/304; 210/456
(58) Field of Classification Search ............... 210/289, 210/456, 304, 263, 266
See application file for complete search history.

(56) References Cited

U.S. PATENT DOCUMENTS

| | | | |
|---|---|---|---|
| 4,368,118 A * | 1/1983 | Siposs ................ 210/136 |
| 4,717,519 A | 1/1988 | Sagami | |
| 4,810,385 A | 3/1989 | Hater et al. | |
| 5,160,039 A | 11/1992 | Colburn | |
| 5,294,335 A | 3/1994 | Chiang | |
| 5,935,436 A * | 8/1999 | Lee et al. ................. 210/257.1 |
| 6,210,567 B1 * | 4/2001 | Takada ........................ 210/169 |
| 6,290,844 B1 | 9/2001 | Tennyson, Jr. | |
| 6,398,038 B1 | 6/2002 | Fontes | |
| 6,461,501 B1 | 10/2002 | Porter | |
| 2004/0238430 A1 * | 12/2004 | Moya .......................... 210/280 |

* cited by examiner

*Primary Examiner*—Duane Smith
(74) *Attorney, Agent, or Firm*—Marshall, Gerstein & Borun LLP

(57) ABSTRACT

A filter assembly for filtering water in an aquatic structure having a housing with a flow inlet and a flow outlet and filter media between the flow inlet and the flow outlet. A vortex distributor is supported in the housing to distribute fluid evenly over the filter media and partially separate debris from the fluid. The vortex distributor has a conically shaped body portion with an upper side, a lower side and a vortex opening. The vortex opening is substantially centered in the body portion and a plurality of vanes are supported on the upper side of the body portion around the vortex opening, the vanes curving away from the vortex opening to form a substantially planar upper surface.

19 Claims, 2 Drawing Sheets

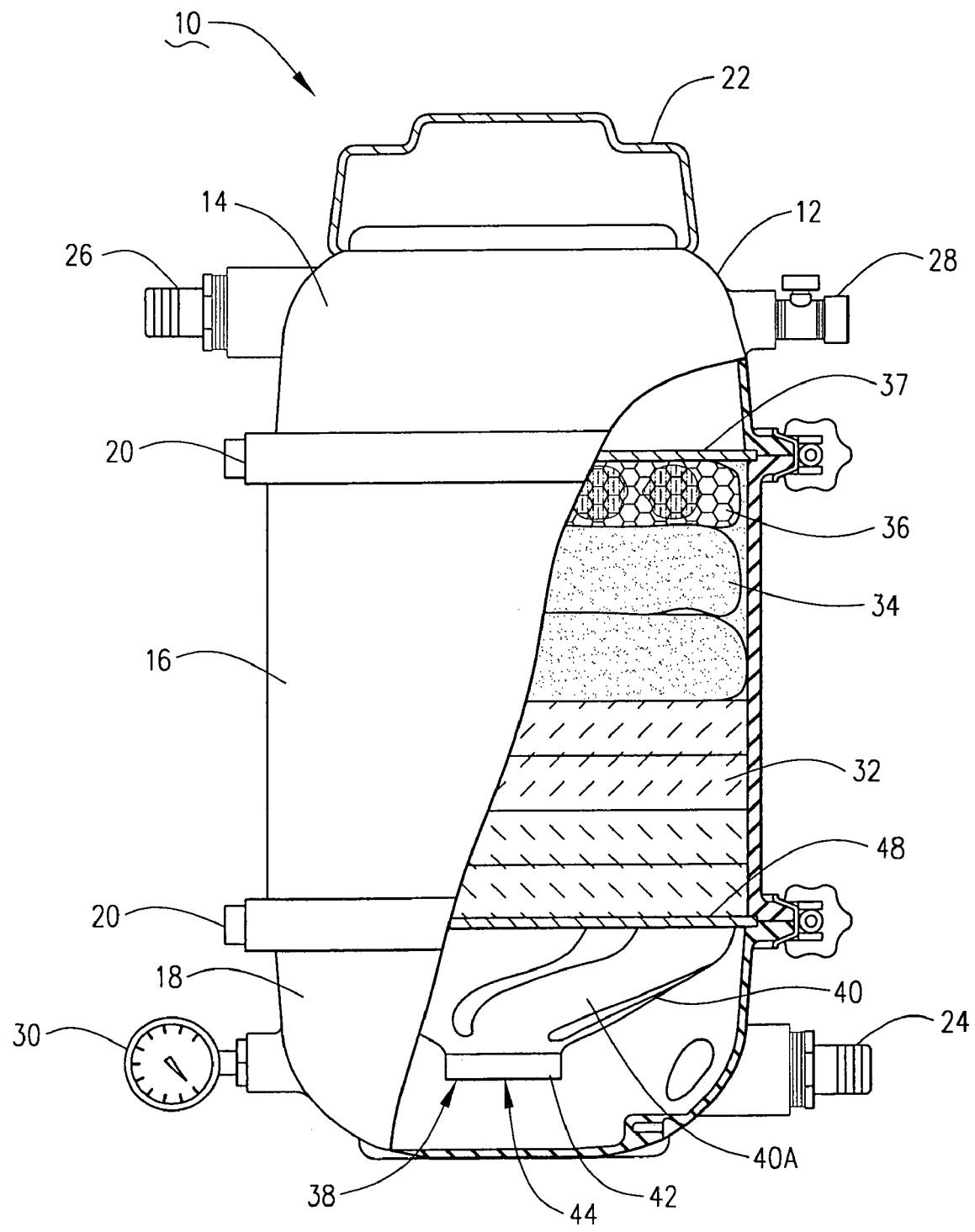
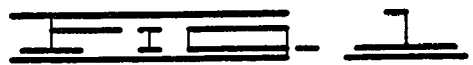

FILTER ASSEMBLY WITH VORTEX FLUID DISTRIBUTOR

RELATED APPLICATIONS

This application claims priority to U.S. Provisional Application No. 60/523,835 filed Nov. 19, 2003, entitled Filter Assembly With Vortex Fluid Distributor.

BACKGROUND OF THE INVENTION

1. Field of Invention

The present invention relates to the field of maintaining aquatic structures, and more particularly but not by way of limitation, to an improved filter assembly having a vortex fluid distributor.

2. Discussion

Ornamental garden pools, ponds, fountains and the like have long been popular landscaping features. Additionally, water systems serving purely utilitarian purposes, such as drainage ponds, are also common landscaping features. Collectively referred to as aquatic structures herein, the aesthetic and utility of such aquatic structures can enhance and improve the environments of both private and community structures, including residential, commercial and civic sites. Also, aquatic structures are used to create habitats for birds and other wildlife.

Because many aquatic structures of the type described are closed systems, there must be means provided to properly maintain water quality. It is especially important that such means prevent the aquatic structures from becoming fouled and stagnant.

One means usually provided for aquatic structures is a skimmer that is disposed to remove floating debris from surface waters. Also, various forms of filtering devices can be provided to remove debris from the skimmed water before the same water is returned to the aquatic structure, sent to drainage, or passed to a downstream filter. A skimmer's filter typically takes the form of a coarse net or basket to catch larger contaminants, such as leaves, twigs, and the like, and in many instances a skimmer incorporates a submersible pump to draw inlet water.

Filtering systems often take the form of a tank containing a filter medium through which water flows and which entraps debris and particulates. Kinds of filter media commonly used are diatomaceous earth, sand, gravel, pellets and the like. The filter media removes contaminants from the water by trapping the contaminants on or in the filter medium.

Depending on the kind of contaminants to be removed, the selection of an appropriate filter media, or layers of filter media, is an art that has been highly developed. The means of cleaning the filter media of accumulated contaminants varies with the type of media utilized, and may simply involve backwashing the media by reverse flowing contaminant free water through the filter.

Maintenance of aquatic structures has largely relied upon commonly found mechanical filtration devices. However, in addition to such mechanical filtration devices, it is often necessary to provide chemical and/or biological filtration devices. For example, U.S. Pat. No. 4,717,519 issued to Sagami, teaches a bacteria bed in an aeration tank for fish ponds. U.S. Pat. No. 4,810,385 issued to Hater et al. teaches a porous material that houses a bacterial culture for degrading waste and other compounds in a collection system. Indeed, there are many commercially available filtration assemblies that combine mechanical, chemical and/or biological media for maintaining water quality in an aquatic structure.

In such filtration assemblies, there is a tendency for the water being filtered to take the least resistive course through the media bed, and as the filter accumulates contaminants, there can be a significant decrease in the operational efficiency of the unit. It is important, therefore, that the flow-through water be distributed evenly across the media bed throughout the filtering cycle.

There is a need for a filtering assembly that maintains filtering efficiency throughout its cycle, and thus there is a need for a filter assembly having the capability to disperse the water uniformly over the filter media throughout its filtering cycle.

SUMMARY OF THE INVENTION

The present application is a filter vortex fluid distribution assembly that provides substantially uniform fluid distribution over a filter media bed.

FIG. 1 is an elevational view in partial cross section of a filter assembly constructed in accordance with the present invention.

DESCRIPTION

Figure 2:
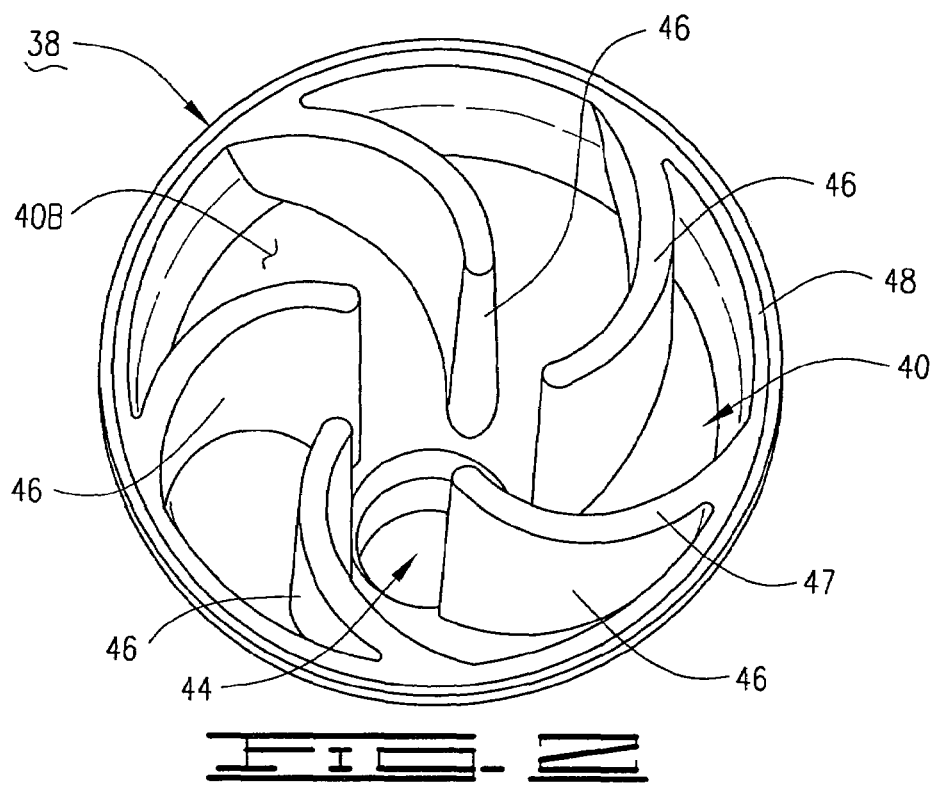
FIG. 2 is a perspective top view of the vortex distributor portion of the filter system of FIG. 1.

Carbon and biological filter assemblies, in cooperation with mechanical filtering means, serve to clean and maintain water quality in aquatic structures such as water garden ponds and the like, and to promote proper biological growth in the water in the aquatic structure. The present invention, in recognition of such, provides an improved filtering system of the following description. It should be noted that like numerals and other figure designations will be utilized throughout the drawings in the identification of similar or identical components. Furthermore, it should be noted that various valves and other plumbing and electrical features that are sometimes provided with filter assemblies are omitted from the drawings and description as such items are not believed necessary for the an understanding of the present disclosure.

Shown in FIG. 1 is a filtering assembly 10 that is constructed in accordance with the present invention. The filtering assembly 10 is comprised of a canister housing 12 that has a top section 14, a center section 16 and a bottom section 18. A first band strap 20 serves to secure together the top section 14 and the center section 16; and a second band strap 20 secures together the center section 16 and the bottom section 18. A wire handle 22 is attached to the top section 14, the ends of the handle 22 being pivotally disposed in appropriately positioned holes in the top section 14.

A fluid inlet port 24 (also referred to as a flow inlet) is provided in the bottom section 18, and a fluid outlet port 26 (also referred to as a flow outlet) is provided in the top section 14 to provide fluid flow communication through the canister housing 12. A backwash valve 28 is supported by an appropriately treaded outlet in the top section 14, and a pressure gage 30 is supported in a threaded outlet in the bottom section 18.

Within the canister housing 12 are a series of filtering media layers disposed so that fluid entering the inlet port 24 will pass through the filtering media on its way through the canister housing 12 to be discharged from the outlet port 26. A mechanical filtration media layer 32, a biological filtration media layer 34 and a carbon filtration media layer 36 are disposed in layered relationship to each other in the center section 16. There are a large number of choices for each of the mentioned filter media. For example, the mechanical filtration media layer 32 is preferably stacked pads of a non-woven polyester filter material that is available from Dott Products, Avon, Ohio. The biological filtration media layer 34 is actually selected having a very large surface area, such as a product identified as bio-balls available from Amiracle Plastics, Inc. of Englewood, Colo. The carbon filtration media layer 36 is activated carbon, available from a large number of sources, preferably in bags or the like.

It will be appreciated that the arrangement of filtering layers may be altered as may be required for any particular aquatic installation; that is, the location of each filtering layer may be changed, and furthermore, one or more of the filtering layers may be deleted or substituted for another one of the filtering layers.

A screen 37 is supported above the carbon filtration media layer 36. It will be noted that the top section 14 is shown to be empty of filtering media in FIG. 1, and it will be appreciated that additional filtering media, such as a bag filter of carbon, can be disposed in the top section 14 and supported on the screen 37. Additional screens can be provided as may be required.

A vortex distributor 38 is disposed in the bottom section 18 and is preferably just below the mechanical filtration media 32. The vortex distributor 38 serves to swirl passing fluid onto the mechanical filtration media 32 and will be described more fully with reference to FIGS. 2 and 3.

Figure 3:
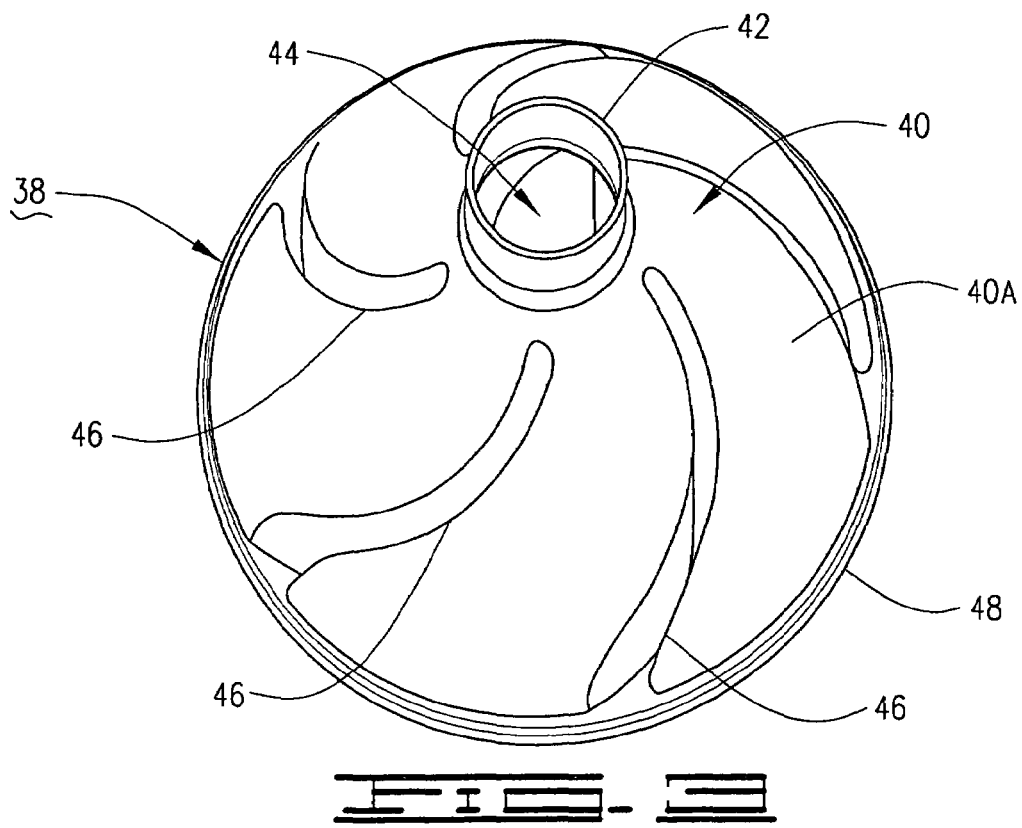
FIG. 3 is a perspective bottom view of the vortex distributor portion of the filter system of FIG. 1.

Turning to FIGS. 2 and 3, the vortex distributor 38 has a body portion 40 that is substantially conically shaped and having a lower, upstream side 40A and an upper, downstream side 40B. A downwardly extending lip 42 surrounds a lipped inlet or vortex opening 44 that is substantially centered in the body portion 40 to provide fluid communication between the upper side 40B and the lower side 40A. It will be recognized that the vortex opening 44 provides a flow passageway for fluid communication between the flow inlet 24 and the filter media 32, 34 and 36.

Rising from, and supported on, the upper side 40B of the body portion 40 are a plurality of vanes 46 that surround and curve outwardly from the vortex opening 44. The vanes 46 serve to swirl the in-flowing fluid along the upper side 40B of the body portion 40 and the flowing fluid is thusly evenly dispersed in its upward passage. The height of the vanes 46 decrease radially along the upper side 40B so that the vortex distributor 38 has flat upper planar surface 47 formed by the topmost edges of the vanes 46, substantially coplanar with a rim 48 extending peripherally at the top of the body portion 40. This permits the vortex distributor 38 to be positioned just below, and in close juxtaposition to, the filter media 32 as shown in FIG. 1.

In many prior art filters the fluid travels directly onto, and through, the filtering media without any kind of fluid distributing means. In such traditional filters, the fluid will tend to travel the path of least resistance, passing through the filtering media. When filtering media become heavily clogged, the in-flowing fluid will attempt to take an alternate route, and often, the flow rate will be reduced, if not stopped. In the present invention, the vortex distributor 38 improves fluid passage by making the flow more evenly distributed, and thus more efficient. That is, the fluid enters the vortex distributor 38 from the bottom, center vortex opening 44. As the fluid travels upwards, it flows outward, similar to a diffuser, and following the contour of the vanes 46 until it reaches the filter media 32.

The fluid is caused to increase in velocity as it moves upwardly in the housing 12 along the vortex vanes 46, and the curved paths of the vanes 46 serve as walls against which the debris must travel to reach the filter media above. Thus, there is a tendency for larger and heavier pieces of debris to remain behind and accumulate in the bottom section 18 of the housing 12. Thus, the vortex distributor 40 helps separate larger debris from fluid flowing upward to block the filter media.

In usage, the filtering assembly 10 is plumbed in a conventional manner to receive fluid, such as water from an aquatic system, via the fluid inlet port 24, and to discharge the fluid via the fluid outlet port 26, with appropriate valving. In time the filter media will accumulate particulates and other matter removed from the fluid, and as this occurs, the pressure gage 30 will indicate the need for back flushing. The backwash valve 28 can be selected for direct attachment to a hose from a water outlet. The filtering assembly 10 can be disconnected from service or can be valved for discharge of back flushing via reverse flow through the fluid inlet port 24. Usually it can be expected that such back flushing will clear the mechanical filter media 32, but it is expected that the carbon filtration media 34 and the biological filtration media 36 will need to be replaced periodically, such as every year or as experience dictates.

It is clear that the present invention is well adapted to carry out the objects and to attain the ends and advantages mentioned as well as those inherent therein. While a presently preferred embodiment of the invention has been described for purposes of disclosure, it will be understood that numerous changes may be made which will readily suggest themselves to those skilled in the art and which are encompassed within the spirit of the invention disclosed and as defined in the above text and in the accompanying drawings.

What is claimed is:

1. A filter assembly for filtering water in an aquatic structure, comprising:
   a housing having a flow inlet and a flow outlet;
   filter media supported in the housing between the flow inlet and the flow outlet so that fluid entering the flow inlet will flow through the filter media and out the flow outlet; and
   means supported in the housing for distributing the fluid substantially evenly through the filter media.

2. The filter assembly of claim 1 wherein the fluid distributing means comprises:
   a vortex distributor having fluid communication between the flow inlet and the filter media.

3. The filter assembly of claim 2 wherein the vortex distributor comprises:
   a body portion substantially conically shaped and having an upper side and a lower side, and having a vortex opening with fluid communication between the upper side and the lower side; and
   a plurality of vanes supported on the upper side of the body portion.

4. The filter assembly of claim 3 wherein the vortex opening is substantially centered in the body portion and wherein the vanes are curved away from the vortex opening to form a substantially planar upper surface.

5. The filter assembly of claim 4 wherein the filter media comprises:
   a mechanical filtration media layer; and
   a carbon filtration media layer.

6. The filter assembly of claim 5 wherein the filter media comprises:
a biological filtration media layer.

7. A filter assembly for filtering a fluid such as water in an aquatic structure, comprising:
a canister housing having a flow inlet and a flow outlet;
filter means disposed in the canister housing between the flow inlet and the flow outlet for filtering fluid passing from the flow inlet to the flow outlet;
means supported in the canister housing for distributing the fluid substantially evenly over the filter means and for separating debris from the fluid entering the flow inlet.

8. The filter assembly of claim 7 wherein the fluid distributing means comprises:
a vortex distributor having fluid communication between the flow inlet and the filter media.

9. The filter assembly of claim 8 wherein the vortex distributor comprises:
a body portion substantially conically shaped and having an upper side and a lower side, and having a vortex opening with fluid communication between the upper side and the lower side; and
a plurality of vanes supported on the upper side of the body portion.

10. The filter assembly of claim 9 wherein the vortex opening is substantially centered in the body portion and the vanes are disposed around the vortex opening and curve away from the vortex opening to form a substantially planar upper surface.

11. The filter assembly of claim 10 wherein the filter means comprises a mechanical filtration media layer.

12. The filter assembly of claim 10 wherein the filter means comprises a carbon filtration media layer.

13. The filter assembly of claim 10 wherein the filter means comprises a biological filtration media layer.

14. A filter assembly for filtering a fluid such as water in an aquatic structure, comprising:
a canister housing having a flow inlet and a flow outlet;
filter media disposed in the canister housing between the flow inlet and the flow outlet so that fluid entering the flow inlet will flow through the filter means and out the flow outlet;
a vortex distributor having fluid communication between the flow inlet and the filter media and supported in the canister housing distributing fluid substantially evenly over the filter media at least partially separating debris from the fluid entering the flow inlet, the vortex distributor comprising:
a body portion substantially conically shaped and having an upper side and a lower side, and having a vortex opening with fluid communication between the upper side and the lower side; and
a plurality of vanes supported on the upper side of the body portion.

15. The filter assembly of claim 14 wherein the vortex opening is substantially centered in the body portion and the vanes are disposed around the vortex opening and curve away from the vortex opening to form a substantially planar upper surface.

16. The filter assembly of claim 15 wherein the filter media comprises a mechanical filtration media layer.

17. The filter assembly of claim 15 wherein the filter media comprises a carbon filtration media layer.

18. The filter assembly of claim 15 wherein the filter media comprises a biological filtration media layer.

19. In a filter assembly having a housing with a flow inlet and a flow outlet, filter media supported for fluid flow there through from the flow inlet to the flow outlet, an improved fluid flow distributor comprising:
a body portion that is substantially conically shaped and having an upstream side and a downstream side with a substantially centrally disposed flow passageway opening providing fluid communication between the upstream side and the downstream side; and
a plurality of vanes extending from the body portion on the upstream side, the vanes extending from near proximity to the flow passageway and radially curving away from the flow passageway, the vanes disposed to direct the fluid flow to be substantially evenly distributed through the filter media.

* * * * *